Sept. 25, 1951 A. V. BEDFORD 2,569,280

SHRINKAGE COMPENSATORY FILM STRIPPING MECHANISM

Filed Sept. 29, 1948 5 Sheets-Sheet 1

Inventor
Alda V. Bedford

Attorney

Sept. 25, 1951 A. V. BEDFORD 2,569,280

SHRINKAGE COMPENSATORY FILM STRIPPING MECHANISM

Filed Sept. 29, 1948 5 Sheets-Sheet 2

Inventor
Alda V. Bedford
By
[signature]
Attorney

SHRINKAGE COMPENSATORY FILM STRIPPING MECHANISM

Filed Sept. 29, 1948 5 Sheets-Sheet 3

Inventor
Alda V. Bedford

By

Attorney

Sept. 25, 1951 A. V. BEDFORD 2,569,280

SHRINKAGE COMPENSATORY FILM STRIPPING MECHANISM

Filed Sept. 29, 1948 5 Sheets-Sheet 4

INVENTOR
Alda V. Bedford
BY
ATTORNEY

Sept. 25, 1951 A. V. BEDFORD 2,569,280

SHRINKAGE COMPENSATORY FILM STRIPPING MECHANISM

Filed Sept. 29, 1948 5 Sheets-Sheet 5

INVENTOR
Alda V. Bedford
BY
[signature]
ATTORNEY

Patented Sept. 25, 1951 2,569,280

UNITED STATES PATENT OFFICE 2,569,280

SHRINKAGE COMPENSATORY FILM STRIPPING MECHANISM

Alda V. Bedford, Princeton, N. J., assignor to Radio Corporation of America, a corporation of Delaware Application September 29, 1948, Serial No. 51,718

14 Claims. (Cl. 178—7.6)

The present invention relates to motion picture film driving mechanisms and more particularly to drive systems designed to compensate for film shrinkage effects in motion picture film television scansion apparatus.

The use of motion picture film for television program material is becoming more and more prevalent as the art progresses and as its use becomes more important, more stringent requirements are being exacted of equipment employed to faithfully transform the motion picture photographic information into television video signals. Presumably, if the quality of motion picture film photographic records is kept reasonably high and a photoelectric system which is faithful in responding to the range of film densities borne by the film is employed in the film scansion, the quality of the reproduced television image at the present state of the art will be at least as good, if not better than the television image produced from camera tubes operating directly from the scene to be televised. This, of course, presupposes that the noise level introduced into the picture by the scansion mechanism is kept reasonably low and that uniform photographic response over the entire film frame area is achieved.

Recent developments have indicated that a flying spot scansion system applied to continuously moving motion picture film provides an exceptionally high quality of television image which is unusually free from objectionable shading effects and evidences a minimum of random noise attributable to photoelectric effects. However, even with the improvements to be derived from flying spot scansion of continuously moving film, the quality of the reproduced television image generally suffers degradation as the result of film shrinkage due to changes in humidity, temperature, and aging of the film material. As will be more fully appreciated hereinafter, in a continuous film motion type of scanner or projection system, film shrinkage effects normally may cause serious misregistration of successive film frames or sections thereof.

Since the standards of the motion picture film industry have been set at a film frame projection or presentation rate of 24 frames per second while television systems employ field scansion rates different from 24 frames per second (RMA television standards in United States requiring an interlaced 30 frames per second by means of 60 field scansions per second) it is normally required to provide some means of resolving the 24 frame per second reproduction of the motion picture film to the field transmission characteristics of the television system. A number of methods for accomplishing this resolution have been proposed a few of which are discussed by E. W. Engstrom, G. C. Beers, and A. V. Bedford in an article entitled "Application of Motion Picture Film to Television" published in the Journal of the Society of Motion Picture Engineers for June 1930. Other projection schemes of this type are discussed by Fordyce Tuttle and Charles D. Reid in the "Problem of Motion Pictures Projection from Continuously Moving Film" in the same journal for February 1932. Furthermore, a copending United States application by A. V. Bedford and G. C. Sziklai entitled "Television Film Scanners," Serial No. 43,986 filed August 13, 1948, provides additional improvements in the television scansion of moving film. However, each method of scanning motion picture film, presently known to the art, is vulnerable to the deleterious effects on the image quality produced by film shrinkage. Certain steps may, however, be taken to compensate for film shrinkage, especially in connection with nonintermittent scansion systems. Such considerations are dealt with in detail in a United States patent application by A. V. Bedford, Serial No. 44,031, filed August 13, 1948 entitled "Film Shrinkage Compensatory System." The general shrinkage problem is treated at length in this last referred to U. S. patent application and a novel method is presented which permits substantial reduction in image misregistration due to film shrinkage. Also a general form of novel film driving sprocket is disclosed which incorporates mechanical features which permit operation and correction in accord with the method of shrinkage compensation disclosed therein.

Another form of film shrinkage compensatory driving sprocket is also described in U. S. patent application Serial No. 47,183 filed September 1, 1948 by Knut Magnusson, this sprocket operates in accordance with the principles disclosed in the Bedford application Serial No. 44,013 supra but offers certain mechanical advantages over the embodiments proposed by Bedford.

The present invention chiefly concerns itself with an improved and simplified form of film shrinkage compensatory driving system finding particular use in non-intermittent motion picture film scansion systems and although also operating in accordance with the teachings of above Bedford U. S. patent application Serial No.

44,013 supra, it does offer marked novel mechanical and operational advantages thereover.

In more particularity, the present invention provides a method of motion picture film propulsion for television scanning system which compensates for film shrinkage effects by interrupting the passage of film through the scanning apparatus during predetermined intervals whose timing is in synchronism with the scansion function of the apparatus. In one of its more practical forms, the present invention provides the aforementioned suspensions in film motion through the action of a novel and automatically adjustable film stripping mechanism associated with a film driving sprocket, the stripping mechanism being so disposed to alter the angular position about the sprocket rotational axis at which the driven film is permitted to part or strip from the driving protuberances of said sprocket. As will be more clearly seen as the specification proceeds, this action is controlled and timed in accordance with the Bedford U. S. patent application, supra, to substantially compensate for film shrinkage effects in television scansion systems.

It is therefore an object of the present invention to provide a motion picture film sprocketing control system adapted for use in connection with continuous film motion television scansion apparatus, wherein the control system produces a series of momentary suspensions in film motion of a predetermined time duration and timing, such as to improve the registration of portions of reproduced television images when the scansion is under the influence of film shrinkage.

It is another purpose of the present invention to provide a motion picture film propulsion system for application in television motion picture film scansion systems whereby compensation for film shrinkage effects is automatically and continuously provided.

Another object of the present invention resides in the provision of a simple means for synchronizing successive interruptions of film passage through continuous film motion television scansion apparatus so as to occur only during television blank out intervals, whereby compensation for film shrinkage effects may be made during these intervals without impairing the appearance of reproduced television image obtained therefrom.

It is another object of the present invention to provide an adjustable film guiding mechanism for use with a conventional film driving sprocket whereby the driving relationship between the sprocket and the film may be momentarily and periodically altered in a predetermined manner while said sprocket is propelling said film.

Still another object of the instant invention resides in certain improvements in the mechanical design of a shrinkage compensatory film driving system over and above the arrangements disclosed in U. S. patent applications by A. V. Bedford, Serial No. 44,013 filed August 13, 1948 entitled "Film Shrinkage Compensatory System," and Knut Magnusson, Serial No. 47,183 filed September 1, 1948, entitled "Film Shrinkage Compensatory Driving Sprocket."

Other advantages and features which are believed to be characteristic of the present invention will become apparent through the perusal of the following specification, particularly when considered in connection with the accompanying drawings wherein.

Figure 1:
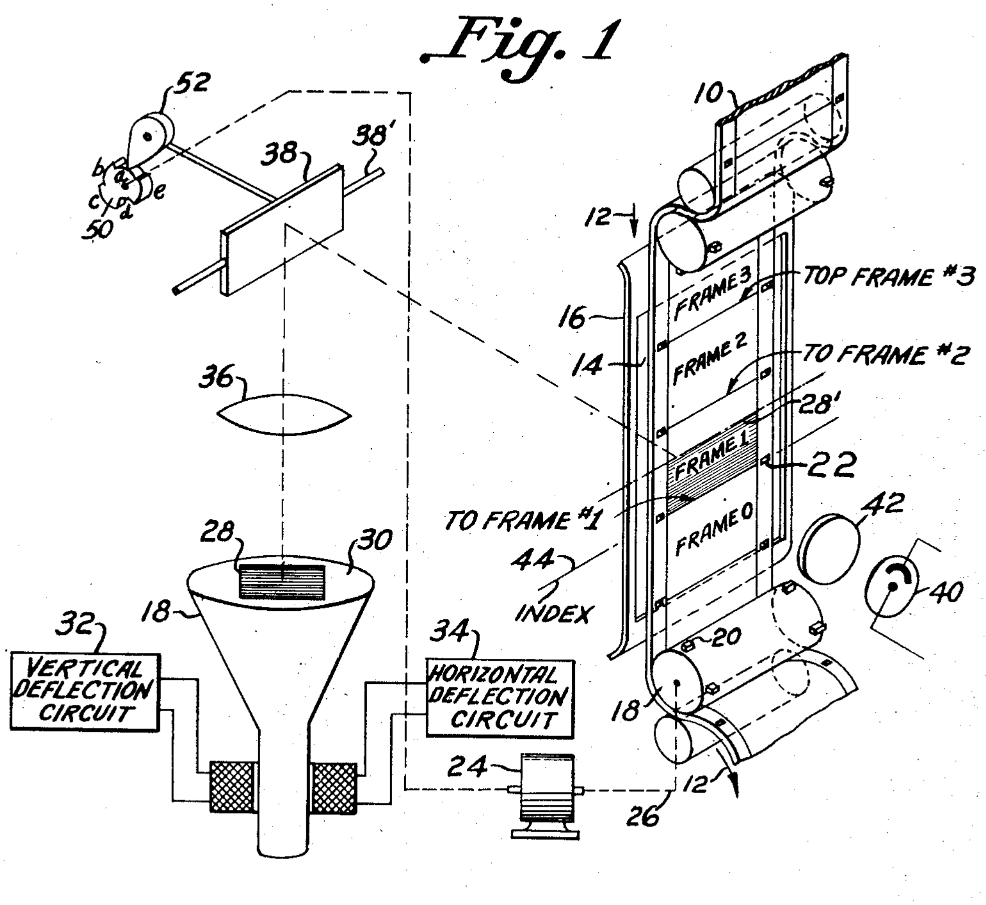
Figure 1 illustrates one form of film scansion system to which the present invention may be applied.
Figure 7:
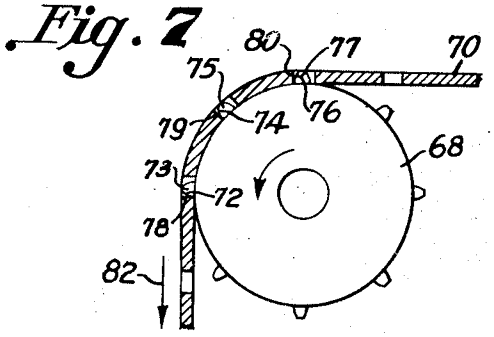
Figure 8:
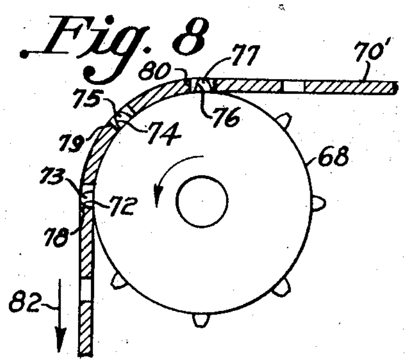
Figure 2:
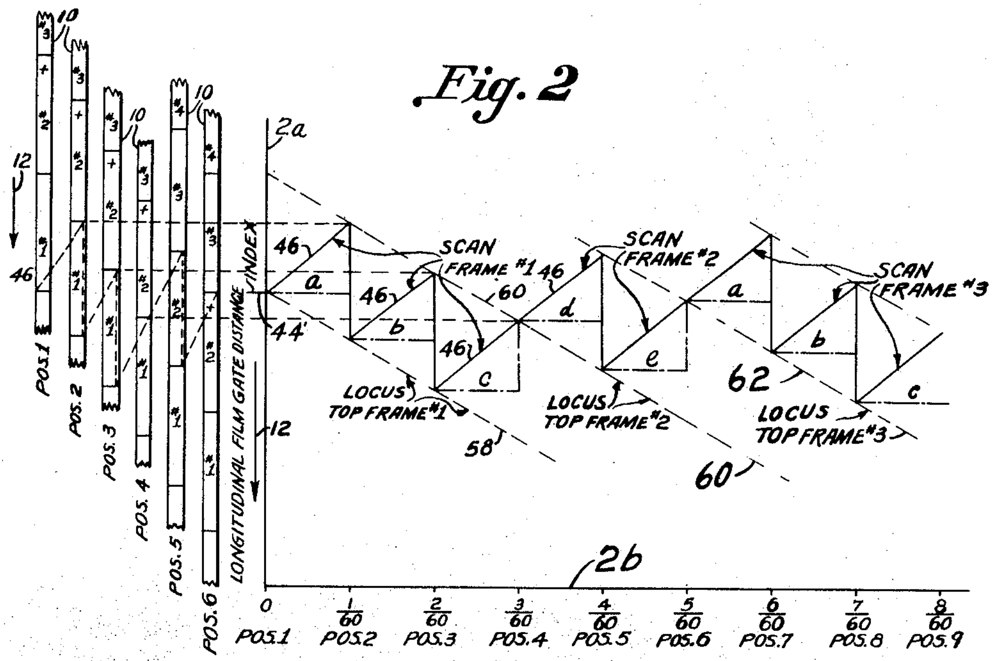
Figure 2 is a graphical representation of certain normal mechanical functions typical of the apparatus shown in Figure 1.
Figure 3:
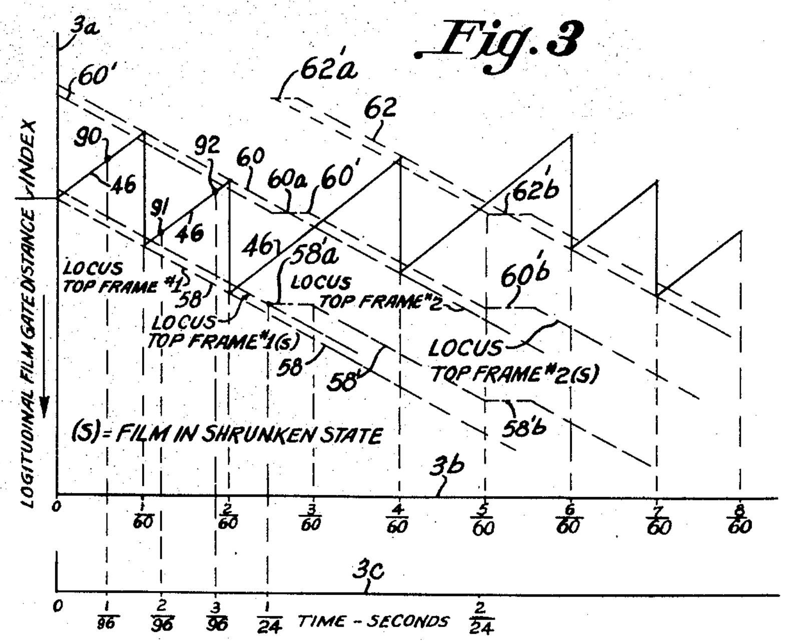
Figure 4:
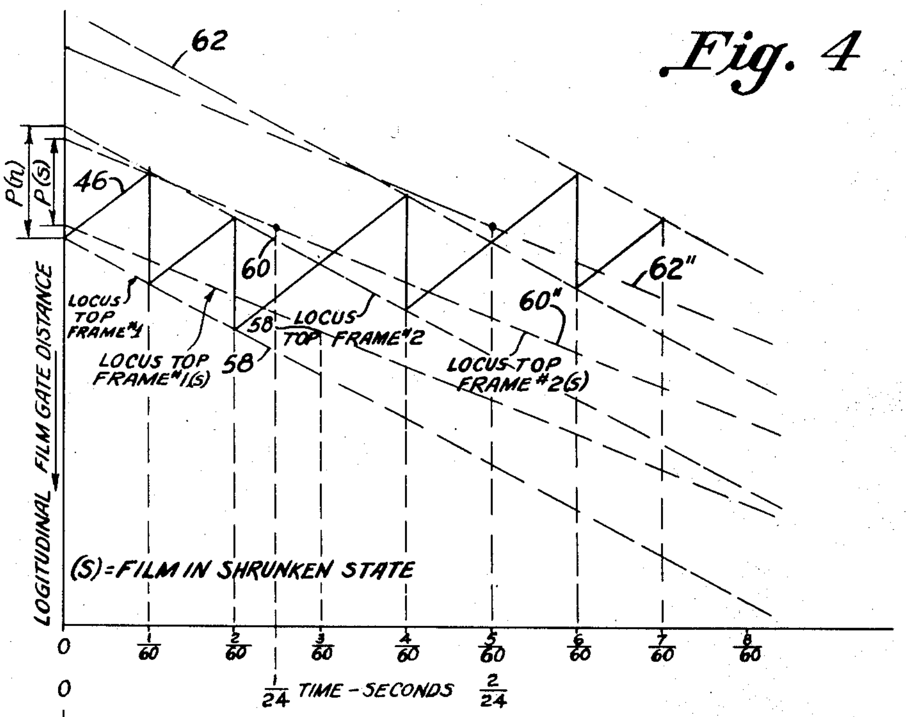
Figure 9:
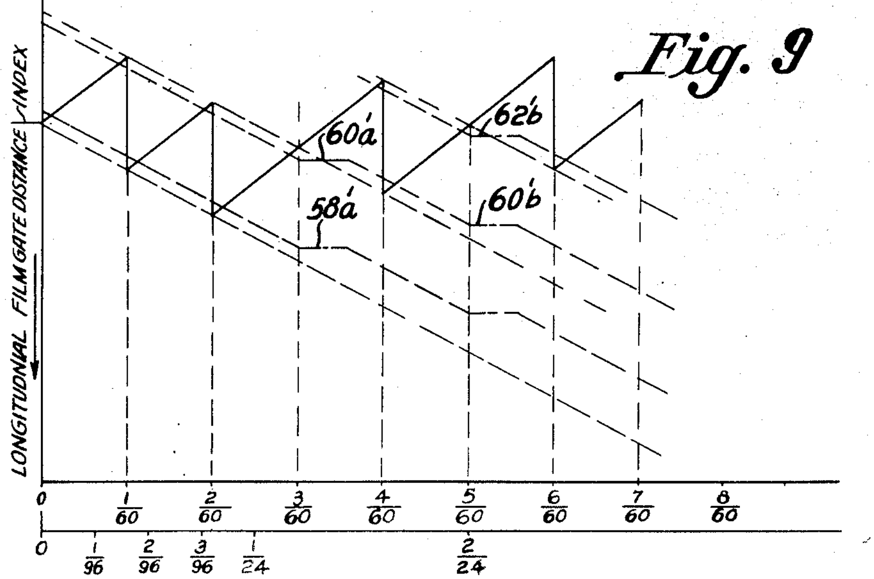
Figure 10:
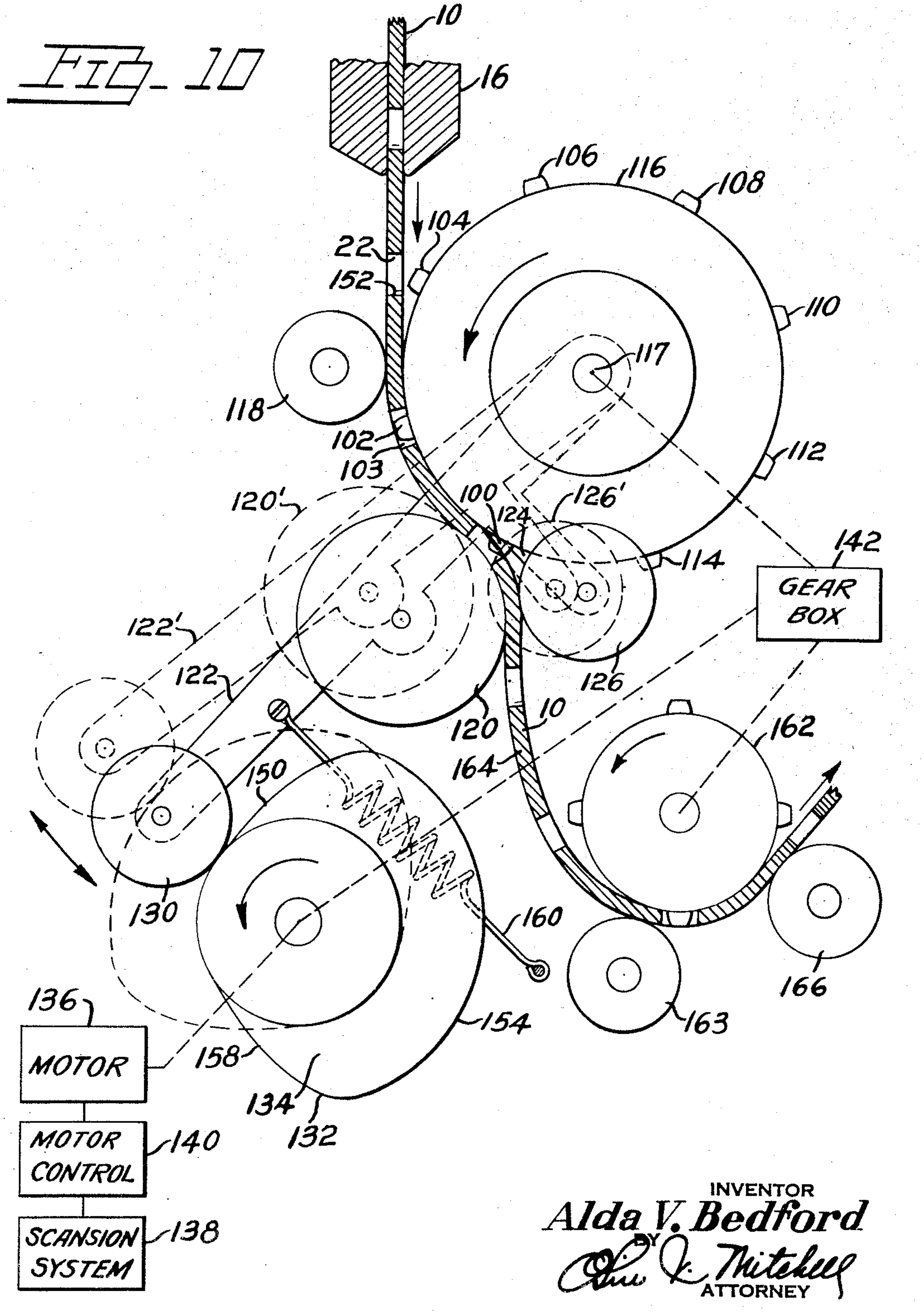
Figure 11:
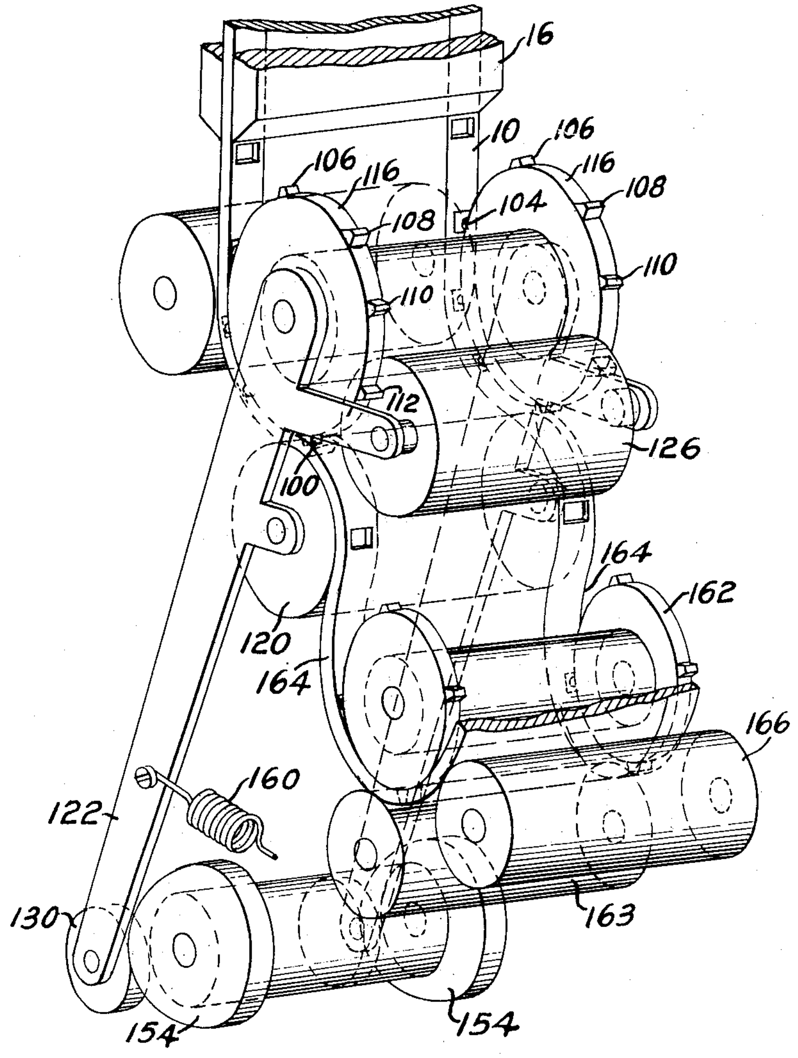
Figure 5:
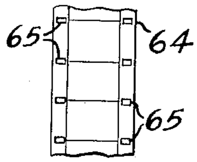
Figure 6:
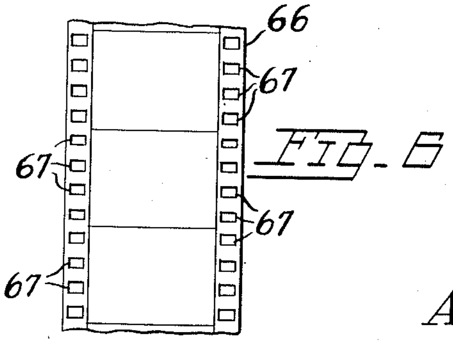

Figure 3 graphically illustrates the mechanical functions set forth in Figure 2 in connection with abnormal mechanical operation of the apparatus in Figure 1 due to film shrinkage;

Figure 4 graphically illustrates the mechanical functions set forth in Figure 2 in connection with a particular form of abnormal mechanical operation of the apparatus in Figure 1 due to film shrinkage;

Figure 5 represents a section of 16 mm. motion picture film;

Figure 6 represents a section of 35 mm. motion picture film;

Figure 7 diagrammatically illustrates the mechanical relationship between a normal driving sprocket and normal motion picture film;

Figure 8 diagrammatically illustrates the mechanical relationship between a normal driving sprocket and shrunken motion picture film;

Figure 9 graphically illustrates the mechanical functions of the apparatus in Figure 1 when employing one form of the present invention;

Figure 10 is a sectional side view of one form of film sprocketing control system provided by the present invention;

Figure 11 is a perspective view of the apparatus depicted in Figure 10.

Referring now to Figure 1, wherein is shown a basic flying spot continuous film motion television scansion system, motion picture film 10 is being impelled in the direction of the arrows 12 past an aperture 14 in a film gate 16 by means of a sprocket 18 having teeth 20 adapted for driving engagement of the film driving perforations such as 22. The sprocket 18 is provided with rotational force by means of motor 24 which is indicated as being mechanically linked to the driving sprocket 18 by means of the dashed line at 26. In accordance with well-known principles of flying spot film scansion, one form of which is described in full detail by U. S. Patent No. 2,261,848 granted to P. C. Goldmark, issued November 4, 1941, an illuminated flying spot raster 28 is produced on the screen 30 of a kinescope 18 through the appropriate actions of horizontal and vertical deflection circuits 32 and 34. The lens 36 collects the light rays from the flying spot pattern 28 and projects them for deflection onto the surface of the rocking mirror 38. After being deflected by the rocking mirror 38 an image of the scanning pattern 28 is brought to focus upon the film 10. In the position shown in Figure 1, the image 28' of the scanning pattern 28 is disposed for scansion of an arbitrarily designated film area such as frame 1. Directly to the rear of the film 10 is the photoelectric cell 40 which receives the light rays of the scanning pattern image 28' after passing through the film and afterward being collected by the lens 42. Through suitable electronic circuits the output of this photocell is adapted to produce a television signal corresponding to the photographic information of film 10 as the flying spot comprising the pattern 28 describes the scanning pattern 28'.

As is well known to the art in a continuous film scansion apparatus of this type, one procedure for resolving 24 frame per second film presentation rate to the RMA standard 60 field per second television standard, as is presently commercially employed in the United States, is to drive the film 10 at a 24 frame per second rate and then scan successive film frames three and two times respectively. For example, frame 1 may be scanned three times corresponding to $3/60$ths of a second and frame 2 scanned two times corresponding to the remaining $2/60$ths of a second, which comprise the $5/60$ths or $1/12$th of a second period required for the presentation of two film frames.

Referring now to Figure 2 in combination with Figure 1, the film 10 is shown in discrete positions Nos. 1, 2, 3, 4, 5 and 6 as it is successively displaced longitudinally along the film gate in the direction of the arrow 12. For ease in describing the nature of the operations to follow, the index level 44 on the film gate 16 in Figure 1 is represented by line 44′ described on the ordinate 2a of the graph in Figure 2. The ordinate 2a represents longitudinal film gate distance and the arrow 12 associated therewith again describes the direction of motion of the film relative to the film gate as it is projected. The index level 44′ is conveniently taken as a starting position for the top of frame 1 (position 1) at the start of the triple scansion of frame 1. Here it will be remembered that in the normal projection of motion picture film, the top of the image photographed on the film frame is actually below the bottom of the film frame image due to the inversion of the motion picture film. Consequently in Figure 1, the image top, which will be referred to as simply "the top of frame 1," is coincident with the arbitrary index 44 on the film gate 16. The rocking mirror 38 is then oriented such that the top of the scanning pattern 28 is also coincident with the index line 44 and at the time zero or the beginning of film scansion, represented on abscissa 2b of Figure 2, the fluorescent spot on the scanning pattern 28 proceeds to scan the film 10 as the film 10 moves on to position No. 2. Study will show that the longitudinal height of the scanning pattern image 28′ as projected on the film 10, need be only $3/5$ths of a frame height to accomplish scansion of frame No. 1 by the time the film reaches position No. 2. The longitudinal position of the electron beam spot image, comprising the scanning pattern image 28′, as it progresses in a direction opposite to film motion to execute its field scansion is represented by a locus line 46 in Figure 2. Therefore in the first $1/60$th of a second, which is the transition time between position No. 1 and position No. 2, film frame 1 is properly scanned the first of three times.

Since the scanning pattern image 28′ in scanning a frame must always have its genesis coincident with the top of the frame image, the second scansion of frame 1 in its position shown by position No. 2 of the film 10, will require that the scanning pattern image 28′ be shifted downwardly in the direction of film motion to position b, whereas for the first scansion its genesis was established at level a which was coincident with the index level 44′. This necessary shifting of the scanning pattern is accomplished by the action of cam 50 acting upon the follower 52 which is in turn disposed to rotate the mirror 38 about its axis 38′. The five constant radius surfaces, designated as a, b, c, d, and e on the cam 50 correspond to the necessary levels to which the genesis of the scanning pattern 28′ must be shifted throughout the five part scansion cycle of the film 10. The cam 50 receives rotational drive in synchronism with the film driving sprocket by means of an appropriate mechanical linkage to the motor 24 indicated by line 54.

The cam position as shown in Figure 1 corresponds to the first scansion of film frame 1. However, for the second scansion of film frame 1, constant radius surface b will displace rotor 52 away from the cam axis such to shift the scanning pattern 28′ to level b (in Figure 2) from which position the second scansion of frame 1 progresses and continues until the film reaches position No. 3. The third scansion of film frame 1, of course, is accomplished in a similar manner during the transition of the film between position No. 3 and position No. 4 during which scansion constant radius c of cam 50 has properly positioned the scanning pattern.

It is seen then that at the end of $3/60$ths of a second, frame 1 has been scanned the required three times and cam 50 then presents constant radius surface d of smaller radius, to the mirror follower 52 so as to raise the genesis of the scanning pattern 28′ to level d (Figure 2) along the film gate in order to make ready for the first scansion of frame No. 2. This first scansion of frame 2 is accomplished during the transition of the film from position No. 4 to position No. 5. The second scansion of frame 2 then follows by positioning of the follower 52 in conformation with constant radius e of the cam 50 which maintains throughout the interval between position No. 5 and position No. 6. At the end of $5/60$ths of a second corresponding to position No. 6 of the film, scansion of both frame 1 and frame 2 has been properly accomplished and the scanning raster returns to the index level a or index 44′ in readiness for the triple scansion of frame 3.

Considering now in more detail the graphical representation in Figure 2, it may be seen that the dashed line 58 represents the locus of the top of frame 1 whereas the dashed line 60 represents the bottom of frame 1 and/or the top of frame 2. Dashed line 62 accordingly, represents the bottom of frame 2 and/or the top of frame 1. Consequently, the slope of the non-horizontal portions of lines 58, 60, and 62 represent the linear velocity of the film 10 in its propulsion through the scansion system of Figure 1. The straight line sections of curve 46 of Figure 2, hereinbefore described as representing the vertical progression of the flying spot as it scans a film frame, clearly illustrate the fact that successive film frames are properly in registration inasmuch as the extremities of these curve portions 46 lie on the locus lines 58, 60, and 62.

There is shown in Figures 5 and 6 respective sections of 16 mm. and 35 mm. motion picture film. It is noticed that the 16 mm. film 64 is provided with driving perforations 65 on the basis of one driving perforation per film frame, whereas the 35 mm. film is provided with driving perforations 67 on the basis of four perforations per frame. The present invention is no way limited to the type of film used, but for sake of clarity and ease in comprehension, further description of the operation of the present invention will be directed to the use of 16 mm. film unless otherwise noted. Accordingly, in Figure 1, 16 mm. film is illustrated and although it is evident that the graph of Figure 2 is not in any way conditional upon the number of driving perforations per film frame, it does assume that the film 10 is being driven at a constant linear rate which for 16 mm. film is approximately 40 feet per second for 24 frame per second presentation rate.

Figure 7 illustrates the relation between a film sprocket such as 68 and motion picture film when properly driving an unshrunken motion picture film such as 70. It is seen that the leading edges 72, 74, and 76 of the sprocket teeth 73, 75, and 77 are all in driving contact with the leading edges 78, 79, and 80 of the respective film sprocket driving perforations. Under such conditions the movement of the film 70 in direction of the arrow 82 by rotation of the sprocket 68 will be substantially at a constant linear rate. However, in Figure 8, the same sprocket 68 is shown in connection with a shrunken film 70'. It is then seen that only the leading edge 72 of the sprocket tooth 73 is in driving contact with the leading edge 78 of the film 70', while the other teeth 75 and 77 although necessarily engaged in the sprocket perforations, are not in contact with the respective leading edges 79 and 80 thereof. Hence, the sole driving force to the film is being applied by the leading edge of the sprocket tooth 73 as the film 70' progresses in the direction of the arrow 82. It is evident that upon further rotation of the sprocket, sprocket tooth 73 will disengage its film sprocket perforation, whereupon the film 70' will tend to halt due to lack of driving contact with either of the other teeth 75 or 77. Hence, neglecting friction effects between film and sprocket and inertia, the film 70' will remain stationary until the leading edge 74 of the sprocket tooth 75 moves sufficiently forward to contact the leading edge 79 of its film perforation, at which time constant velocity propulsion of the film will again be provided until such time as the sprocket tooth 75 disengages its film driving perforation. As a result of this action, the shrunken film 70' is transported past the film gate 16 in Figure 1 with a series of hesitations, each hesitation or film halt being in duration proportional to the degree of shrinkage manifested by the film with said hesitations occurring once per film frame.

Turning now to Figure 3, the effects of this film shrinkage will be considered in connection with the scanning cycle hereinbefore described with reference to Figure 2. The dashed lines 58, 60, and 62 corresponding to the loci of the tops of frames 1, 2, and 3, respectively are again shown in their proper relationship to the scanning curve 46 for an unshrunken film. The redrawing of this dashed line loci has been executed simply for illustrative purposes. Now under the conditions of shrunken film the distances between the top and the bottom of the respective frames due to the shrinkage of the film material therebetween will be reduced. The top of frame 1 of a shrunken film is indicated by the "dashed-dot" locus line 58' whereas the top of frame 2 under shrunken film conditions may be represented by the "dashed-dot" locus line 60'. The ordinate 3a of the graph in Figure 3, of course, represents longitudinal film gate distance as did the ordinate 2a in Figure 2 and the abscissa 3b is a time scale broken in 60ths of a second again in accordance with Figure 2. An additional abscissa 3c for cooperation with the ordinate 3a is provided as a secondary time scale and is subdivided into 24ths of a second. The first 24th of a second is in turn broken into 96ths of a second for reasons of convenience hereinafter to become evident.

The fact that the shrunken film as it is impelled past the film gate hesitates every $\frac{1}{24}$th of a second as before brought out, may be illustrated by the horizontal sections 58'a, 60'a, and 62'a, of the "dashed-dot" loci of the tops of the shrunken film frames 1, 2, and 3. This illustration further shows that at the end of the first 24th of a second the film actually stands still for all practical purposes, until the next sprocket tooth drivingly engages the film, at which time the film is driven at a constant linear speed until the next hesitation occurring at $\frac{2}{24}$ths second shown at 58'b, 60'b, and 62'b.

The film hesitations produced by film shrinkage effects, even under conditions of severe film shrinkage, persist for a time duration of substantially less than a vertical blanking interval and therefore the delay intervals as depicted in Figure 3 by the horizontal sections of the dashed loci lines, such as 58'a, are obviously grossly exaggerated in order to lend clarity to the illustration. For example, under conditions of 1% film shrinkage, the film would hesitate approximately 1% of $\frac{1}{24}$th of a second, or $.01\times.04$ second$=.0004$ second, whereas the vertical blanking interval for a standard television signal is about 5% of $\frac{1}{60}$th of a second or $.05\times.016=.0008$ second. Thus, it appears that for film shrinkage as large as 1%, the maximum duration of film shrinkage compensatory halts would not be greater than ½ of a vertical blanking interval. Furthermore, the halt intervals as represented by the horizontal sections of the film frame loci are depicted as being rather abrupt transitions from normal 24 frame per second film propulsion to a stationary mode and then followed by rapid acceleration up to the normal propulsion rate again. Obviously, in practice the inertia of the film itself would prevent such rapid deceleration and acceleration, thereby making the halt intervals more properly representable by a slowing down of the film propulsion rather than an actual film halt. However, to more clearly illustrate the principles underlying the operation of the present invention, an exaggerated halt period, as shown in Figure 3 as well as hereinafter depicted in Figure 9, has been utilized.

It will be observed that during the film transition from position No. 3 to position No. 4 (or during the third scansion of frame 1), the shrunken film will disadvantageously halt directly in the center of this third scansion cycle. Hence, the television field corresponding to third scansion of frame 1 will necessarily be badly distorted and consequently not agree in registration with the scansions of the same frame accomplished during the first two field scansions of that frame. In the case of film frame 2, it is apparent that this halting or suspension of film motion due to film shrinkage effects, although occurring at 58'b, 60'b and 62'b does not yield any deleterious effects inasmuch as they occur at the end of a television field scansion. For this instance in particular, the suspensions of motion begins at $\frac{5}{60}$ths of a second, which is equivalent to $\frac{2}{24}$ths of a second, or the time taken for television scansion presentation of two complete film frames. The reasons that no ill effects are felt from this film hesitation at this time, derives wholly from the fact that a television vertical blank out signal occurs at every $\frac{1}{60}$th of a second or at a time when no video image information is being transmitted or reproduced.

Therefore in accordance with the present invention, the hesitation in film movement normally occuring at $\frac{1}{24}$th of a second as in Figure 3, is eliminated and postponed to occur at $\frac{3}{60}$ths of a second as shown at 58'a and 60'b in Figure 9. Consequently the necessary slippage of the film to make up for the shrinkage when postponed to occur at intervals of $\frac{3}{60}$ths and $\frac{2}{60}$ths of a second may be made to occur during television blank out intervals, during which hesitation of the film will create no problem.

From the foregoing analysis it appears that it is only necessary to insure postponement of only one film motion suspension due to shrinkage, namely that suspension corresponding to the ends of frames 1, 3, 5, 7 and so forth for operation as described in Figures 2 and 3, since the suspension occurring at the ends of frames 2, 4, 6, 8, etc. are of less concern. In most instances, however, it is desirable to also provide additional means for insuring that the film motion suspension occurring at the ends of even numbered frames are initiated at exactly those 24th of a second intervals which coincide with the 60th of a second intervals such that the duration of the film suspension does not "hang over" the television blank out time.

It may be noted at this time that if 35 mm. film were being driven by successive driving perforations numbering four per frame, the hesitations or film shrinkage compensatory motion suspensions would occur at every 1/64th of a second and in accordance with Figure 3 the phenomenon illustrated at 58'*a*—60'*a*—62'*a* in connection with 16 mm. film would occur four times during the scansion of frame 1 which occurrent positions are indicated by dots 90, 91, 92, as well as at 58'*a*. The distortion of the television images would therefore be markedly greater under these conditions. The obvious correction for this increased effect would be to provide active engagement of only one out of every four driving perforations by the sprocket for the 35 mm. film. Under such driving conditions for the 35 mm. film the remaining problem is identical to that as described in connection with 16 mm. film.

The teeth of the sprocket 68 shown in Figures 7 and 8 are illustrative of the very simplest form of sprocket tooth contours and no effect has been made to illustrate a type of tooth contour which would tend to minimize the abruptness at which the hereinbefore described shrinkage compensatory interruptions occur. Certain types of film sprocket tooth contours which tend to minimize the ripple or flutter imparted to the film due to the necessary shrinkage compensations are well known to the art and find particular usefulness in film systems incorporating sound track reproducing equipment. Such sprockets operate to impart a substantially constant rate of propulsion to the film under two conditions, to wit; for film exhibiting no shrinkage or for film exhibiting a discrete amount of shrinkage, under which latter conditions the sprockets necessarily reduces the average linear velocity of the film in the process of compensating for the shrinkage. The exact mechanism by which these types of sprockets operate are normally based upon particular forms of tooth contour designs and will not be herein considered in detail due to the familiar nature of such devices to those skilled in the art. However, it is to be noted that although such special "smoothing" sprockets operate to "smooth out" film flutter due to shrinkage effects and thereby impart to the film a constant but lower rate of propulsion, the registration problems resulting from shrinkage effects are in no way helped by the use of such sprockets.

The effect of a "smoothing" sprocket operating under ideal conditions to effect a reduced but constant velocity propulsion, free of "flutter," of shrunken film in connection with a television film scansion mechanism as described in connection with Figure 2, is illustrated in Figure 4. Again a portion of Figure 2 has been reproduced in Figure 4 to form a basis for comparison between conditions obtaining under operation with shrunken and unshrunken film. Accordingly, dashed loci lines 58, 60, and 62 again represent respectively the loci of the tops of frames 1, 2, and 3 as normal unshrunken film would be propelled through the system as illustrated in Figure 2. The pitch or distance between frames is here indicated by the arrow $P_n$ which is indicated for comparison with the pitch $P_s$ illustrated for film in a shrunken state. Correspondingly, the "dashed dot" lines 58", 60", and 62" represent the respective loci of the tops of frames 1, 2, and 3 of shrunken film as it is propelled through the system shown in Figure 1 at a reduced constant velocity rate resulting from the action of an idealized special "smoothing" sprocket. Indeed the situation resulting in this case is even more aggravated from a registration standpoint than was exhibited in connection with the simple tooth action illustrated in Figure 3, for it is evident that whereas the first two scansions and a portion of the third scansion of frame 1 were in registration in Figure 3, here each successive scansion of frame 1 is displaced from the previous scansion and in registration therewith. Although in Figure 4 no particular distortion of the third scansion field of frame 1 is encountered due to sprocket tooth action in connection with shrunken film, it is seen that the cumulative action of the reduced but constant velocity of film propulsion results in successively deeper scansions into frame No. 0 during the intended three scansions of only frame 1. Manifestly then, the mere provision of constant velocity propulsion of the film at a reduced rate to compensate for linear shrinkage effects, in no way improves successive field registration in scansion systems of the type under consideration whereas controlled interruptions of the film motion according to the method disclosed and illustrated in Figure 8 do provide satisfactory correction of film shrinkage effects through the medium of the film driving mechanism.

According to the present invention in order to provide the necessary postponement of film shrinkage compensatory halts to ensure motion suspension at every 3/60ths and 2/60ths of a second for alternate film frames, a novel controlled sprocketing arrangement as shown in Figures 10 and 11 may be employed. Here the film 10 is being propelled past the film gate 16 (similar to the arrangement shown in Figure 1) through the consecutive driving engagement of the film driving perforations, such as 22, by the sprocket teeth 100, 102, 104, 106, 108, 110, 112, and 114 on driving sprocket 116. The film 10 is held against the driving sprocket 116 by means of idler 118 and the idler 120. Although the idler rotational axis 118 is fixed relative to the rotational axis 117 of the sprocket 116, the idler 120 is mounted on radially extending actuating arm 122 and disposed for circumferential angular displacement about the sprocket rotational axis 117. Also mounted on an extension 124 of the radially extending actuating arm 122 is another idler wheel 126, which maintains the film 10 in contact with the outer surface of idler wheel 120. With this arrangement, movement of the actutaing arm 122 about the sprocket axis 117 will provide a positive action to alter the angular position, relative to the sprocket axis, at which the film 10 departs from the driving sprocket periphery.

In the mechanical phase shown, the film 10 has just received propulsion for the entire 3/60ths of a second scansion interval and is about to undergo scansion for the succeeding 2/60ths of a second interval. As hereinbefore developed, for proper shrinkage compensation, the film 10 must be released from driving engagement by tooth 100 so that the tooth 102 may be permitted to contact the leading edge 103 of the corresponding driving perforations to thereby supply constant velocity drive to the film during the coming 2/60ths of a second scansion interval. The lower end of the actuating arm 122 is therefore provided with a cam follower wheel 130 which conforms to the driving surface 132 of control cam 134. The rotary motion of the control cam 134 as driven by the motor represented by block 136, is held in synchronism with the scansion system 138 through a motor control arrangement such as 140. In the instance where 24 frame per second propulsion of the film 10 is to be provided and the film is of the 16 mm. variety wherein one set of film perforations per frame is provided, the driving sprocket 116 is driven from the motor 136 through gear box 142, at 3 revolutions per second, while the cam 134 is driven at 12 revolutions per second. In the present showing of Figures 1 and 2, the idler wheels 120 and 126 are positioned to allow stripping or separation of the film 10 from driving relationship with the sprocket tooth 100 at the very outset of the succeeding 2/60ths of a second scanning interval. This will allow a reduction in film velocity until the tooth 102 moves into driving contact with film perforation edge 103. As before described this period of film velocity reduction or halt will then fall within first vertical blank out period of the subsequent 2/60ths scansion interval to eliminate visible evidence of the film compensatory halt. While the tooth 102 is driving the film for the 2/60ths of a second scansion interval, the cam follower 130 encounters the lift portion 150 of the cam 134 which displaces the arm 122 to rest at position 122′. This displacement may be accomplished with readily achievable values of mechanical acceleration so that by the time the 2/60ths of a second scansion interval is completed, the idler 120 is in the position 120′, which will provide release of the film driving perforation associated with tooth 102 at the termination of this 2/60ths of a second scansion interval. This properly timed release again provides the required halt in film propulsion until the tooth 104 contacts the leading edge 152 of the film perforation 22, which defines the beginning of the next successive 3/60ths of a second scansion interval. Subsequent to this, the cam follower 130 will leave the constant radius surface 154 of the cam follower to encounter the drop section 158 of the cam periphery and thus permit return of the actuating arm 122 through the angle $\theta$ to its original position shown in solid lines, the spring 160 supplying the necessary return driving force for this phase of the operation.

With an 8 tooth driving sprocket such as 116 and the required 12 revolutions per second rotation of the control cam 134, the necessary angular displacement $\theta$ of the control arm 122 will be such to alter the point of departure on the driving sprocket periphery by a linear distance along the sprocket periphery equivalent to ⅕th of a film frame, and will assign to the angle $\theta$, a value of 9 degrees:

$$\theta = \tfrac{1}{5} \times \tfrac{1}{8} \times 360 = 9^\circ$$

In order to make the action more uniform, a secondary driving sprocket such as 162 may be provided so that a free film loop 164 is maintained between the idler 120 and the secondary driving sprocket. In the case of illustration where the secondary driving sprocket is provided with 4 driving teeth, it is evident that it must be driven at 6 revolutions per second and such drive is shown as conveniently derived from the motor 136 through a suitable section of the gearing system included in gear box 142.

In the construction of the embodiment shown in Figures 10 and 11, it may be desirable to fabricate idler wheels 118, 120, 163 and 166 of yieldable material so that double film thicknesses represented by splices in the film may be accommodated. If it is not desirable to make the idler wheels of appropriate yieldable material, they may be made of non-yieldable stock and the necessary mechanical yieldability provided through suitable mounting of the idlers relative to their supports.

In the above embodiment although specific contour of cam 134 is illustrated, it is noted that the respective lift and dwell segments of the cam surface are indeed quite flexible as to their duration. Furthermore, the relative positions of the idler wheels with respect to the driving sprocket 116 admits of many combinations, any of which may be properly proportioned in accordance with the features of the present invention. Although idler pulleys at 120 and 126 have been shown as the guiding agency for direct control of the engagement of the film 10 by the sprocket teeth, suitable non-rotative guiding mechanisms disposed for angular displacement relative to the rotational axis of the film driving sprocket, may be employed with equivalent film compensatory action provided such mechanism is properly synchronized with the film scansion operation. It is further noted that whereas the film driving sprocket may be very conventional in nature it may, in some instances, be advisable to reduce sprocket tooth length to a minimum so as to ensure more rapid release of the film when moved by the guiding idlers.

From the foregoing description, it is seen that the applicant has provided an improved form of film shrinkage compensatory driving system which lends itself particularly to television scansion apparatus, moreover, the film guiding device as well as its corresponding control mechanism is economical of construction and is particularly advantageous from the standpoint of the relatively large tolerances with which the majority of the structure may be fabricated.

Having now described the invention, what is claimed and desired to be secured by the Letters Patent is the following:

1. In a television motion picture film scanning apparatus in combination, a rotary sprocket for drivingly engaging unshrunken motion picture film with a plurality of sprocket teeth at any one time and impelling said film through a scanning section of said apparatus with a constant linear velocity, a film stripping mechanism for acting upon said film for moving said film out of driving engagement with any one of said sprocket teeth at any given time to thereby momentarily suspend motion of shrunken film through the scansion section of said apparatus, a control system for said stripping mechanism adapted for cyclically activating said stripping mechanism in fixed timing relation with the peripheral speed of said sprocket, and means including said control system for so defining the timing of the intermittent film motion suspensions so established that the average linear speed of the film through the scansion section is reduced commensurately with the degree of film shrinkage so to establish a constant frame presentation rate through the apparatus scansion section.

2. Apparatus according to claim 1 wherein there is additionally provided an actuating arm pivoted for rotational movement about the rotational axis of said driving sprocket and wherein said stripping mechanism comprises two bearing surfaces in respective contact with opposite film sides, each surface being in turn supported by a member fixed relative to said actuating arm.

3. In a film strip utilization apparatus a driving means for said film operative to propel said film when said film is placed in driving relationship therewith, film stripping mechanism for acting upon said film to displace said film out of driving relationship with said driving means, a control mechanism connected with said stripping mechanism for cyclically altering the successive driving intervals during which said stripping means is active on the film, means indicative of sprocket rotation speed, and timing means connected between said indicative means and said control mechanism active to maintain said cyclic stripping of film drive in fixed timed relation to said sprocket speed.

4. In a motion picture film utilization apparatus, a rotable toothed sprocket oriented to normally drivingly engage the driving perforations of motion picture film with a plurality of sprocket teeth, a stripping mechanism active upon the film to displace the film relative to said sprocket such to void driving relationship between the film and only one of said sprocket teeth at a time, a movable means for positioning said stripping mechanism relative the rotational axis of said sprocket, and means for cyclically driving said movable means to produce oscillatory movement of said stripping mechanism through a discrete angular arc described about said rotational axis.

5. In a motion picture film utilization apparatus, a rotable sprocket oriented to normally drivingly engage the driving perforations of motion picture film, a stripping mechanism adjacent the sprocket periphery and active upon the film to displace the film relative to said sprocket such to void, at a given angular position about the axis of said sprocket, any driving relationship between the film and any given single sprocket tooth at any given instant, a movable means for positioning said stripping mechanism relative to the rotational axis of said sprocket to alter said given angular position at which said stripping mechanism acts, a control mechanism for said movable means, means indicative of sprocket rotational speed and means operable to connect said control mechanism and speed indicative means such as to establish sprocket drive of said film only during alternate intervals of unequal duration.

6. In a film strip utilization apparatus a driving means for said film operative to propel said film when said film is placed in driving relationship therewith, a stripping mechanism active upon said film to displace said film out of driving relationship with said driving means at a position relative to the rotational axis of said sprocket determined by the position of said stripping mechanism relative to said axis, means for rhythmically changing the position of said stripping mechanism to only within the limits of a given arc described about said rotational axis and means for timing rhythmic changing means in fixed relation to the speed of sprocket rotation.

7. In a motion picture film utilization apparatus, a rotable sprocket for drivingly engaging the driving perforations of motion picture film, a film guiding arrangement for positioning film in driving relationship with said sprocket, a stripping mechanism moveable relative to the film guiding arrangement for displacing, out of driving relationship with said sprocket, only a given section of film drivingly engaged by said sprocket, and a control mechanism for rhythmically altering the position of said stripping mechanism, and timing means for said control means connected thereto such to permit said sprocket to drive the film during alternate intervals of unequal durations.

8. In a television scanning system for motion picture film wherein the film frame presentation rate is different from the television field scansion rate and wherein provision is made for sequential plural scansions of successive film frames, a film driving arrangement for minimizing the effects of film shrinkage said driving arrangement comprising in combination, a rotable driving sprocket having a plurality of teeth thereon for engaging the driving perforations of a motion picture film, each tooth being nominally spaced to provide driving engagement of shrunken film by only one tooth at a time, an adjustable film stripping mechanism for acting upon said film for moving the section of film including the driven film driving perforation out of driving relationship with said driving sprocket and a positioning mechanism linked with said strpping mechansm for conditionally altering the angular position about the rotatonal axis of said driving sprocket at which said stripping mechanism is permitted to act.

9. Apparatus as described in claim 8 wherein there is additionally provided means for holding said positioning mechanism in mechanical synchronism with the recurrent television field scansions of said system said positioning mechanism being so phased relative thereto to allow constant linear velocity propulsion of said film at least during sequential plural television field scansions of any individual film frame but to interrupt said film propulsion during the television signal blankout intervals corresponding to the transition from scansion of one successive film frame to the next successive film frame.

10. A film scansion apparatus as defined in claim 8 wherein said film stripping mechanism comprises two members disposed to contact respective film sides, and wherein there is additionally provided a common carrier for said members pivoted about the rotational axis of said driving sprocket.

11. Apparatus as defined in claim 10 wherein said control mechanism comprises a rotary cam mounted for periodic angular displacement of said common carrier about its pivot.

12. An adjustable film guiding apparatus for use as a driving sprocket stripping mechanism in motion picture equipment comprising in combination a moveable supporting member mounted for rotation about the rotational axis of a motion picture film driving sprocket, a first and second film guiding wheel rotationally mounted on said member, such that the periphery of one wheel is yieldingly spaced relative to the periphery of the other wheel to thereby receive and guide moving film therebetween, the free end of said supporting member being adapted for cyclic translation through a given angular displacement about said driving sprocket rotational axis.

13. An adjustable film guiding apparatus for use as a driving sprocket stripping mechanism in motion picture equipment comprising in combination a moveable supporting member mounted for rotation about the rotational axis of a motion picture film driving sprocket a first and second guiding device yieldable with respect to one another and each with a film bearing surface thereon, each of said devices being mounted on said member such that the bearing surface of one device is spaced relative to the bearing surface of the other device such to receive and guide moving film therebetween, the free end of said supporting member being adapted for cyclic translation through a given angular displacement about said driving sprocket rotational axis.

14. In a television motion picture film scanning apparatus in combination, a rotary sprocket for drivingly engaging motion picture film and impelling said film through a scanning section of said apparatus with constant linear velocity, an actuating arm pivoted for rotational movement about the rotational axis from said driving sprocket, a film stripping mechanism comprising two bearing surfaces in respective contact with opposite film sides, each surface being in turn supported by a member fixed relative to said actuating arm, said film stripping mechanism and arm being adapted for momentarily and intermittently moving said film out of driving engagement with said sprocket to thereby momentarily suspend motion of the film through the scansion section of said apparatus, a control system for said stripping mechanism, and means including said control system for so altering the timing of the intermittent film motion suspensions so established that the average linear speed of the film through the scansion section is reduced commensurately with the degree of film shrinkage so as to establish a constant frame presentation rate through the apparatus scanning section.

ALDA V. BEDFORD.

REFERENCES CITED

The following references are of record in the file of this patent:

UNITED STATES PATENTS

| Number | Name | Date |
|---|---|---|
| 1,882,014 | Howell | Oct. 11, 1932 |
| 2,051,787 | Foster | Aug. 18, 1936 |
| 2,071,878 | Huc | Feb. 23, 1937 |
| 2,178,242 | Runge | Oct. 31, 1939 |